Figure 1:
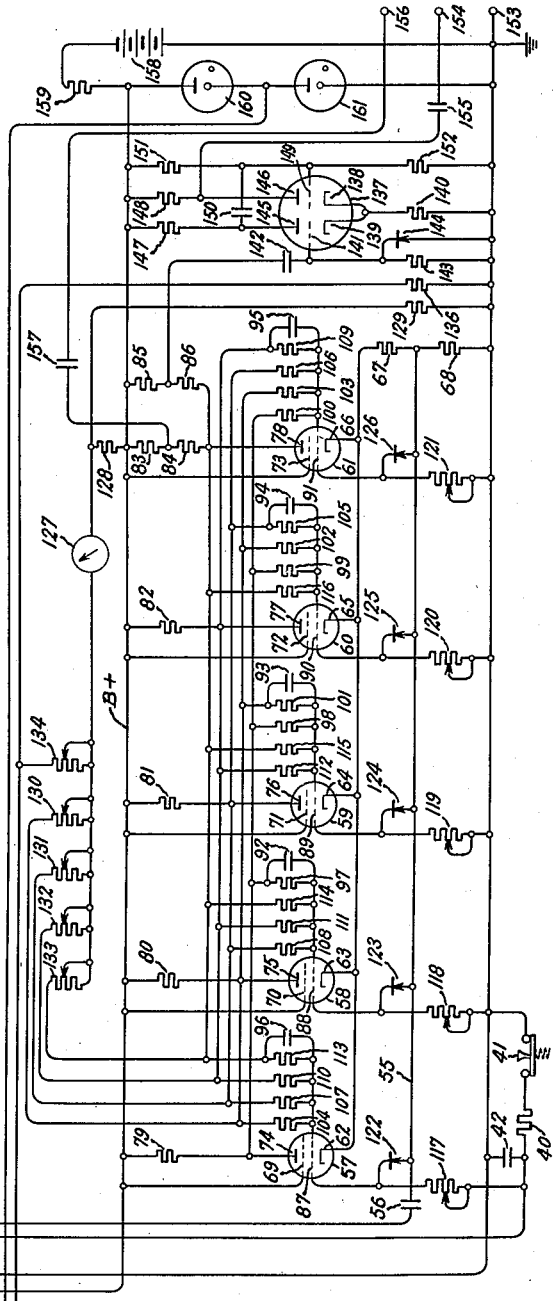
Figure 1:
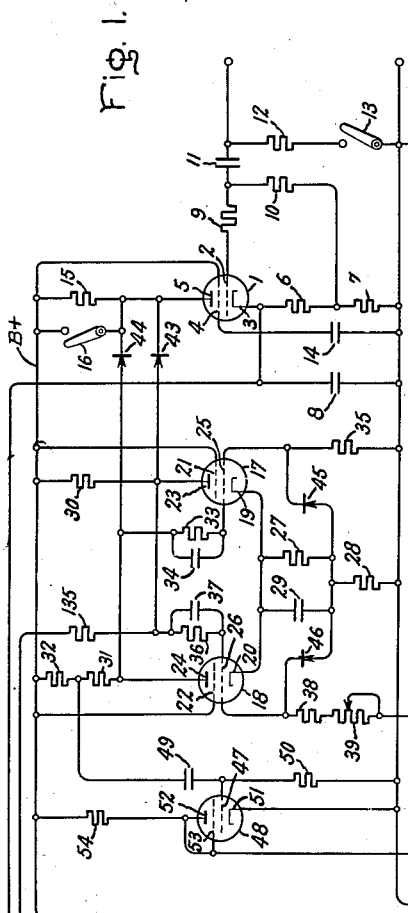

Feb. 5, 1952  J. L. LAWSON  2,584,720
ELECTRONIC COUNTER

Filed Oct. 26, 1946  2 SHEETS—SHEET 1

Inventor:
James L. Lawson,
by Prowell & Mack
His Attorney.

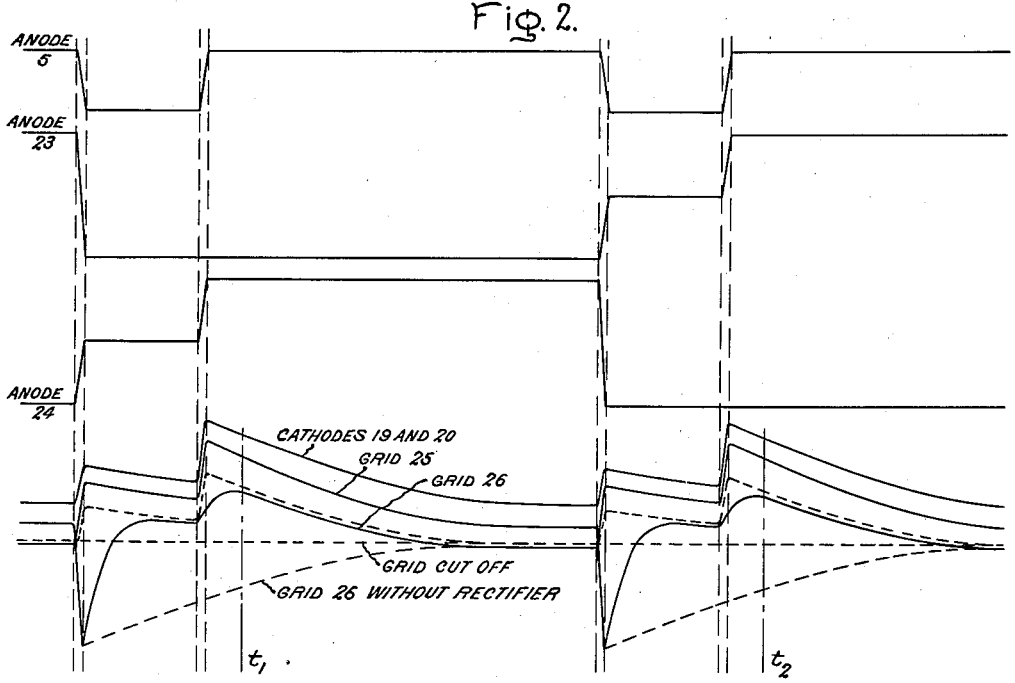

Patented Feb. 5, 1952

2,584,720

UNITED STATES PATENT OFFICE 2,584,720

ELECTRONIC COUNTER

James L. Lawson, Schenectady, N. Y., assignor to General Electric Company, a corporation of New York Application October 26, 1946, Serial No. 706,036

2 Claims. (Cl. 235—92)

My invention relates to electronic counters and more particularly to a new and improved electronic counter capable of counting extremely rapidly recurring pulses without sacrificing accuracy and without the necessity of maintaining critically close tolerances in circuit elements.

Mechanical registers or counting devices are in general use wherever the elapsed time during which they operate and reset in preparation for the next condition to be registered is sufficiently small in comparison to the time interval between the incidents it must register. Definite limitations such as weight and inertia of the mechanical parts cannot be avoided and as a result such mechanical devices become inaccurate and of little utility when attempting to count impulses of a high recurring rate.

Heretofore, electronic counters employing thermionic tubes have been used whereby an output pulse is produced at a rate which is some chosen submultiple of the impulse rate being counted. These output pulses may then be counted by a mechanical registering device. In this fashion, the range over which counting measurements may be made has been increased greatly. In counting electrical pulses occurring within a microsecond of each other, electrical reset time of previously known electronic counters becomes a limitation such that the present devices lose their accuracy and therefore their utility in that region. It is apparent that an electronic counter capable of counting pulses accurately whether occurring at an extremely high rate or at any other discontinuous rate is a needed and desirable device.

It is an object of my invention to provide a new and improved electronic counter which is accurate in counting electrical pulses even though the pulses are occurring in extremely rapid succession and still maintaining its ability to count pulses however far separated individual pulses may be.

Another object of my invention is to provide a new and improved electronic counter capable of recording accurately pulses of extremely short duration over a greatly extended range of periodicity of the electrical pulses.

It is a further object of my invention to provide a new and improved electronic counter whose accuracy is relatively independent of source voltage fluctuations or temperature and humidity effects upon circuit elements such as resistances and condensers.

The features of the invention which are believed to be novel and patentable will be pointed out in the claims appended hereto.

For a better understanding of the invention, reference is made in the following description to the accompanying drawing in which Fig. 1 discloses a circuit which is one embodiment of my invention, Fig. 2 is a series of curves representing voltage variations in various tube elements when the circuit of Fig. 1 receives pulses to be counted and Fig. 3 is a tabular representation of the operating sequence of the circuit of Fig. 1.

In Fig. 1 a circuit is shown wherein one output pulse occurs for every ten input pulses. It will be understood that other desired ratios may be obtained without departing from the scope of my invention. The circuit shown includes, in general, amplifier and phase inverter stages, a flip-flop circuit with two conditions of stable equilibrium, a ring counter or multiple flip-flop circuit comprising, in the preferred embodiment, a series of five tubes so interconnected that only one of the tubes is in a conducting state at any time, and a multivibrator of the type generally referred to as a one-shot multivibrator. Rectifiers preferably of the germanium crystal type are used in the circuit for purposes to be described. However, rectifiers of other types such as diode tubes may also be employed.

The positive polarity pulses to be counted are impressed upon the control grid 2 of an amplifier and phase inverter thermionic tube 1 which is normally biased at or near cutoff. Cathode 3 of tube 1 is maintained at a fixed potential with respect to ground by connection to a suitable D. C. voltage source. Cathode 3 is also connected to ground through resistors 6 and 7 in series shunted by a bypass condenser 8. Control grid 2 having a grid current limiting resistor 9 in series therewith is maintained at proper bias voltage by connection to the junction between resistors 6 and 7 through a resistor 10. Input pulses are capacitively fed to grid 2 through a condenser 11. If desired for impedance matching purposes the input terminals may be connected together through a resistor 12 by manually closing a switch 13 in series therewith. Screen grid 4 of tube 1 is maintained at the regulated B+ voltage by proper connection thereto and a bypass condenser 14 is provided between screen grid 4 and ground. Anode 5 of tube 1 is connected to B+ through a plate resistor 15 which may be made electrically ineffectual in the anode circuit by a shorting switch 16 placed across resistor 15.

Thermionic tubes 17 and 18 with their associated elements constitute a stable flip-flop circuit of the type which requires external triggering for each change from one condition to the other. Cathodes 19 and 20 of tubes 17 and 18 respectively are both connected to ground through a common path consisting of serially connected resistors 27 and 28, one of which, resistor 27, being preferably of much lower resistance than resistor 28, is shunted by a biasing and bypass condenser 29. Screen grids 21 and 22 of tubes 17 and 18 are maintained at B+ potential and anode 23 of tube 17 is connected to B+ through a resistor 30 and anode 24 of tube 18 is connected to B+ through resistors 31 and 32 in series. Control grid 25 of tube 17 is connected to anode 24 of tube 18 through a resistor 33 which is shunted by a condenser 34 and is also connected to ground through a resistor 35. Likewise, control grid 26 of tube 18 is cross connected to anode 23 of tube 17 through a resistor 36 which is shunted by a condenser 37. Control grid 26 is also normally connected to ground through serially connected resistors 38, 39, and 40, and a normally closed switch 41. Resistor 40 and switch 41 in series is shunted by a condenser 42. A connection between anode 23 of tube 17 and anode 5 of tube 1 is provided through a rectifier 43 connected to offer minimum opposition to current flow when anode 23 is at a higher potential than anode 5. Similarly, a connection between anode 24 of tube 18 and anode 5 of tube 1 is provided through a rectifier 44 connected to offer minimum opposition to current flow when anode 24 is at a higher potential than anode 5. Rectifiers 45 and 46 are so connected between the ungrounded terminal of resistor 28 and grids 25 and 26 of tubes 17 and 18 respectively in such direction that minimum opposition to current flow by the rectifier concerned occurs if the grid is lower in potential than the potential of the ungrounded terminal of resistor 28.

A portion of the voltage variation of anode 24 of tube 18, such as that across resistor 32 in series with anode 24, is capacitively coupled to the control grid 47 of a normally conducting isolating and phase inverter tube 48 by means of a condenser 49. Control grid 47 is also connected to ground through a resistor 50 while the cathode 51 of tube 48 is grounded directly. Anode 52 and screen grid 53 are made common to operate the tube as a triode and connected to B+ through a resistor 54. The variation voltage of anode 52 is made available for control to the lower portion of Fig. 1 by capacitively coupling anode 52 to lead 55 by a condenser 56.

Thermionic tubes 57, 58, 59, 60 and 61 are so interconnected that only one of the tubes is in a conductive state at any particular time and by proper impulses upon lead 55 the conductive state may be transferred from one tube to the next in a sequence chosen by proper connections between them. The cathodes 62, 63, 64, 65 and 66 of tubes 57, 58, 59, 60 and 61 respectively are connected to ground through a single voltage divider common to all cathodes. Resistors 67 and 68 in series constitute the voltage divider and lead 55 is connected to the junction of resistors 67 and 68. The screen grids 69, 70, 71, 72 and 73 of tubes 57, 58, 59, 60 and 61 respectively are each maintained at B+ potential by connection thereto. Each anode is connected to B+ through a separate resistance or resistances; anode 74 through resistor 79, anode 75 through resistor 80, anode 76 through resistor 81, anode 77 through resistor 82, and anode 78 through resistors 83 and 84 in series shunted by resistors 85 and 86 in series. In addition, each anode is connected to each of the control grids of the remaining tubes through separate resistances and is capacitively coupled to only one control grid, namely the control grid of the next tube chosen in any sequential order.

In the circuit shown, anode 74 of tube 57 is capacitively connected to control grid 88 of tube 58 by condenser 92 and in similar fashion anode 75 of tube 58 to control grid 89 of tube 59 by condenser 93, anode 76 of tube 59 to control grid 90 of tube 60 by condenser 94, anode 77 of tube 60 to control grid 91 of tube 61 by condenser 95, and anode 78 of tube 61 to control grid 87 of tube 57 by condenser 96. Each anode of tubes 57 to 61 is also connected through a separate resistor to each of the control grids of the other tubes in the group. Thus, anode 74 of tube 57 is connected through resistor 97 to grid 88 of tube 58, through resistor 98 to grid 89 of tube 59 through resistor 99 to grid 90 of tube 60 and through resistor 100 to grid 91 of tube 61.

In addition to the connections from control grids to anodes, each control grid of tubes 57 to 61 is connected to ground through a separate resistance path of adjustable ohmic value. Thus, control grid 87 of tube 57 is connected to ground through resistors 117 and 40 in series, grid 88 of tube 58 through resistor 118, grid 89 of tube 59 through resistor 119, grid 90 of tube 60 through resistor 120, and grid 91 of tube 61 through resistor 121. Rectifiers 122, 123, 124, 125 and 126 are connected between lead 55 and control grids 87, 88, 89, 90 and 91 respectively, in such direction that the rectifiers become conductive if the control grid voltage is negative with respect to lead 55. Lead 55 is maintained at a voltage very close to the cathode voltage by connection thereto through a low value resistor 67, which may be of the order of one-twentieth the resistance of resistor 68.

An indicating device such as meter 127 preferably of the milliammeter type is provided for use in indicating which tubes in the counting circuit are in a conducting state. One terminal of meter 127 is maintained at an essentially constant voltage by connection to the junction between serially connected resistors 128 and 129 which constitute a voltage divider connected between B+ and ground. The other meter terminal is connected to the anodes 75, 76, 77 and 78 through respective adjustable resistors 130, 131, 132, and 133 and, in addition, is connected through an adjustable resistor 134 to the junction of serially connected resistors 135 and 136 which resistors constitute a voltage divider connected between anode 23 of tube 17 and ground. Resistors 130 to 134, inclusive, are each adjusted to a desired value such that, for example, unit current flows through resistor 134 when tube 17 is conducting, twice unit current flows through resistor 130 when tube 58 is conducting, four times unit current through resistor 131, and so on. In each resistor, current flow is made essentially zero when the tube is nonconducting by proper choice of ohmic values in resistors 128 and 129.

The double triode tube 137 is employed in a one-shot multivibrator circuit of such type that one half is normally conducting and returns automatically to the conducting state after an external triggering pulse has transferred conduction to the other half. Cathodes 138 and 139 of tube 137 are grounded through a biasing resistor 140. Control grid 141 of the first half of tube 137 is capacitively coupled to the anode circuit of tube 61 by connecting a condenser 142 between the junction of resistors 85 and 86 and grid 141. Grid 141 is also connected to ground through a grid resistor 143. Also grid 141 is essentially prevented from becoming negative with respect to ground by connecting a recifier 144 between grid 141 and ground. Anodes 145 and 146 are connected to B+ through respective plate resistors 147 and 148. Control grid 149 of the second half of tube 137 is capacitvely coupled to anode 145 by a condenser 150 and is also connected to the junction of resistors 151 and 152 which resistors constitute a voltage divider connected between B+ and ground. Voltage variation of anode 146 is made available between output terminals 153 and 154 by connecting terminal 153 to ground and terminal 154 to anode 146 through a condenser 155. The voltage variation of anode 78 of tube 61 is made available between an output terminal 156 and terminal 153 by connecting terminal 156 through a condenser 157 to the junction between resistors 83 and 84.

A regulated D. C. voltage supply may be obtained by impressing any unregulated D. C. source such as battery 158 across a circuit consisting of a resistor 159, a voltage regulator tube 160, and a voltage regulator tube 161 in series in the order named. A regulated D. C. voltage is available across tube 161 for biasing tube 1 while a regulated D. C. voltage of greater magnitude is available across tubes 160 and 161 in series for supply to the various anodes and screen grids of the tubes utilized.

The principles of and the method of operation of the circuit shown in Fig. 1 may be set forth in the following manner. When the circuit is properly energized and no input pulses are impressed upon the input terminals, either of tubes 17 and 18 but not both will be in a conducting state and any one but only one of tubes 57, 58, 59, 60 and 61 will be in a conducting state. Slight dissymmetries in circuit elements or tube characteristics may determine the state of the circuit when first energized. It is immaterial, however, what condition is initially present since the system may be set to proper conditions by opening momentarily the normally closed switch 41 thereby allowing grid 26 of tube 18 and grid 87 of tube 57 to drift toward a positive potential with respect to their respective cathodes thereby causing tubes 18 and 57 to conduct which in turn as will be explained, causes tubes 17, 58, 59, 60 and 61 to be in a nonconducting state.

The amplifying and phase inverter circuit including the normally nonconducting tube 1 receives positive pulses impressed upon its grid and if switch 16 is open as indicated causes the voltage of anode 5 to decrease in corresponding pulse manner from its normal value at or near B+ voltage. This is illustrated by the properly identified curve of Fig. 2. Cathode 3 of tube 1 is maintained at a fixed potential thereby eliminating bias shift dependent upon pulse recurrence frequency as would result if tube 1 were self-biased. If switch 16 is closed, it is apparent that no negative pulses will be produced by anode 5 of tube 1 whether or not positive pulses are impressed upon the grid 2 of tube 1. Thus, switch 16 may be used to control the time at which a counting sequence is begun and the time at which it is ended without disturbing in any way the input source or its connections to the timing circuit. By employing a high resistance in resistor 9, grid 2 of tube 1 will be essentially prevented from becoming positive with respect to cathode 3 of tube 1 because of voltage drop in resistor 9 caused by grid current flow when grid 2 tends to become positive. Thus, a series of positive pulses of unequal magnitude but none of which are smaller in magnitude than the bias voltage of tube 1 may be impressed across the input terminals and the resulting negative anode pulses will be of essentially equal magnitude by virtue of the described grid clipping action.

The flip-flop circuit including tubes 17 and 18 is initially or is made to be such that tube 18 is conducting and tube 17 is nonconducting. The potential of anode 23 is then essentially at B+ and anode 24 is at some lower voltage. The cathodes 19 and 20 are biased positively by plate current of tube 18 flowing through resistors 27 and 28. The voltage divider between anode 24 and ground consisting of resistors 33 and 35 in series holds grid 25 of tube 17 at or just below cutoff when tube 18 is conducting or when anode 24 is at its lower voltage value. Likewise, the voltage divider between anode 23 and ground consisting of resistors 36, 38, 39 and 40 in series hold grid 26 of tube 18 above cutoff value when anode 23 is essentially at B+ potential thereby allowing tube 18 to remain in a conducting state. Since the circuit is symmetrical these voltage dividers are similar as to resistance values, and if tube 17 is conducting and tube 18 is nonconducting grid voltages at grids 25 and 26 are likewise interchanged by action of these voltage dividers.

Condensers 34 and 37 are required since the interelectrode capacitance of the grid would otherwise prevent grid voltage from being dependent upon the change in voltage across the voltage divider and may for very rapidly repeating pulses, as for example pulses separated by less than a microsecond or extremely short pulses regardless of pulse repetition rate, cause the grid voltage to remain unaffected thereby rendering the circuit inaccurate and practically useless as a counting device. It can be shown that there is a critical value which condensers 34 and 37 must exceed in order to assure proper operation of the circuit. This may be expressed as:

$$C > \frac{C_g R_g}{R_{pg}}$$

where:
$C_g$ = total input grid capacitance of tube.
$R_g$ = resistance from grid to ground.
$R_{pg}$ = resistance from grid to anode of other tube.

Condenser 37 charges to a voltage equal to the voltage drop across resistor 36 and condenser 34 to that across resistor 33. When tube 18 is conducting, condenser 37 is charged to a greater value than is condenser 34 since greater total voltage appears across the voltage divider of which resistor 36 is a part than across the one embracing resistor 33. If tube 17 becomes conducting instead of tube 18, the reverse condition exists and condenser 37 must be discharged to some extent and condenser 34 additionally charged before normal static conditions are obtained. Therefore, unless correcting means are introduced, during any transition the grid of the tube becoming nonconducing is driven far beyond cutoff and returns to the desired position at or just below cutoff with a definite time lag as its condenser 34 and 37 is discharged. This is illustrated by the curve of Fig. 2 labelled "grid 26 without rectifier." This time lag or recovery time is objectionable since the circuit may be unresponsive to the next succeeding pulse during the recovery period.

It is known that the discharge or charging time for a condenser is dependent upon the capacity of the condenser and the ohmic value of the resistance through which it must charge or discharge. Accordingly, if resistors 33 and 36 could be made small, the recovery time would be decreased. However, resistors 33 and 36 must be fixed portions of their respective voltage dividers and it is necessary to use voltage dividers of sufficient total resistance to prevent them from affecting the anode voltages of the tubes to which they are connected. Thus, other means must be sought in decreasing the recovery time of the circuit.

An efficient means for materially decreasing the recovery time, which is believed to be novel, is by the use of rectifiers which become conductive when the grid is below cutoff value of the tube. Thus, if grid 26 is driven negatively and grid 25 positively as by applying a negative pulse to anode 23 of tube 17, a discharge path for condenser 37, in parallel with resistor 36, is provided through rectifier 46, resistor 27 shunted by condenser 29, and through tube 17 which is now in a conducting state. Likewise, when grid 25 is driven below cutoff, condenser 34 may be discharged through rectifier 45, resistor 27 shunted by condenser 29, and tube 18 which is at that instant in a conducting state. It should be noted that grids 25 and 26 are restored to a voltage dependent upon the instantaneous voltage of the cathodes which may be shifting in voltage with respect to a reference such as ground potential. Thus, the grids are not necessarily restored to a fixed voltage value but instead to a changing value, which at any instant, differs from the instantaneous cathode voltage by the desired amount. Thus, the circuit is very quickly made ready to operate satisfactorily in response to the next succeeding pulse. The curves of Fig. 2 labeled "grid 25 and grid 26" illustrate the voltage variation of the grids as affected by rectifiers 45 and 46.

Triggering of the flip-flop circuit is accomplished by connecting anodes 23 and 24 to anode 5 of tube 1 through respective rectifiers 43 and 44 and occurs in the following fashion. Resistor 15 is made small with respect to either resistor 30 or resistors 31 and 32, in series, so as to minimize the effect on anode 5 voltages when rectifiers 43 and 44 become conducting. Also, the voltage variation of anode 5 of tube 1 is made to be approximately half the voltage variation of anodes 23 and 24 of tubes 17 and 18 for reasons to be stated.

Initially, tube 18 is conducting or is made so by manipulation of switch 41. Anode 23 of tube 17 is at essentially B+ voltage as is also anode 5 of tube 1. Anode 24 is below B+ voltage because of current flow through plate resistors 31 and 32 in series. When a positive pulse is impressed upon grid 2 of tube 1, anode 5 moves in a negative direction to a point essentially half way between B+ and anode 24 voltage. Anode 23 is also moved with anode 5 by action of rectifier 43. Grid 26 of tube 18 is thereby driven negatively and current flow in tube 18 is decreased to essentially zero. Anode 24 therefore increases in voltage since current flow through resistors 31 and 32 in series is decreased. However, anode 24 cannot become positive with respect to anode 5 of tube 1 because of rectifier 44. When anode 24 increases in voltage, so also grid 25 of tube 17 increases to the same extent and tube 17 becomes conductive, thereby causing anode 23 to decrease to a voltage essentially equal to the voltage formerly maintained at anode 24. At the end of the negative pulse on anode 5 of tube 1, the voltage of anode 24, as well as that of anode 5, is allowed to increase to essentially B+ value. It is now apparent that the voltage variation of anode 5 of tube 1 cannot be made equal to that of anodes 23 and 24 since the negative pulse of anode 5 must not only drive grid 26 negatively but must also allow grid 25 to increase positively. Grid 25 would remain unaffected by the pulse if anode 5 decreased in voltage to a point equalling anode 24 voltage.

Each time the grid 25 is moved in a positive direction, which occurs twice for each alternate pulse, namely, at the beginning and at the end of each alternate pulse, as has been pointed out, tube 17 becomes conductive to a value more than the desired normal value until condenser 34 is able to charge up to the higher value required when the voltage divider consisting of resistors 33 and 35 in series is subjected to essentially the total D. C. B+ voltage. This condition also exists for grid 26 and the conductivity of tube 18 at the time of the next succeeding pulse or series of such alternate pulses. Therefore, complete self biasing of the cathodes of tubes 17 and 18, as by utilizing a condenser between cathodes and ground, is not desirable, one reason among others, being that the cathode bias would shift upwardly as the pulse repetition rate increased. Thus, resistor 28 is provided without being shunted by a condenser. This allows the cathode voltage to increase momentarily during conditions of greater tube current flow, but the cathodes will return to the proper and original value when condensers 34 or 37 have again received their proper charge. In addition, a condenser across resistor 28 would slow down the tendency of the cathodes to return to their normal value. If such a condenser were used it is possible, particularly for short pulses of a high repetition rate, that the grid potential of the tube made conductive by external triggering may decrease more rapidly than the cathode voltage so as to cause it to become nonconducting without external pulsing and thereby automatically triggering the other tube. Since resistor 28 is common to both tubes, the triggered tube may operate similarly so as to retrigger the original tube. This undesirable unstable condition in tubes 17 and 18 may be avoided by minimizing the capacitance across resistor 28.

Voltage variations of the various elements of tubes 17 and 18 with respect to any reference, for example, ground, are shown in Fig. 2. The dotted alternative portions of the grid voltage variation curves illustrate the grid voltage variation which would result if rectifiers 45 and 46 were removed from the circuit. By inspection of the curves at the time indicated by $t_1$, it is evident that if the next succeeding pulse were to begin at time $t_1$, tube 18 would not be made conductive since grid 26 of tube 18 would not be driven above cutoff if the restoring action of rectifier 46 is absent. Similarly, in the absence of rectifier 45, tube 17 could not be made conductive at the time indicated by $t_2$. Since it is desirable to render the circuit susceptible to all pulses even though closely spaced as would result in extremely high pulse repetition rates, it is evident that the presence of rectifiers 45 and 46 greatly improves the performance of the circuit.

The normally conducting thermionic tube 48 is operated at zero bias and operates as a combination amplifier, phase inverter, and clipper. Clipper action is accomplished by driving the grid far below cutoff with a very short RC time constant grid circuit and utilizing grid current flow during positive swings to prevent the grid from becoming materially positive with respect to the anode and thereby having little effect on plate current during such positive swings. Accordingly, anode 52 of tube 48 provides a positive pulse of short duration each time tube 18 becomes conductive, i. e., a positive pulse for every two input pulses. Negative pulses of anode 52, if present, are insufficient in magnitude to affect the circuit subjected thereto.

The circuit associated with tubes 57 to 61, inclusive, may be explained as follows. If, after initial energization of the circuit, switch 41 is momentarily opened grid 87 of tube 57 rises and causes tube 57 to be conductive. When switch 41 is reclosed tube 57 remains conductive while the remaining tubes are nonconductive as will be shown. The grid of any tube will be maintained during static operating conditions at either of two voltages by means of its connections through proper resistors to ground and to each of the anodes of the other tubes. These resistors act like an equivalent voltage divider which is subjected to either the total D. C. B+ voltage as when the four other anodes are all at B+ or to a smaller voltage as when three anodes are at B+ but the fourth is at some lower value. All tubes are biased to the same degree since all cathodes are connected together. The bias value is so chosen by choice of resistors 67 and 68 such that the lower grid voltage value is below cutoff and the higher grid voltage is above cutoff. Since the bias is obtained by current flow through the tubes themselves, at least one tube must be conducting. Further, if one tube conducts, the grid voltage of the conducting tube is higher than that of any other grid, since its grid is the only one connected to anodes all of which are essentially at B+ voltage, thereby assuring its continued conduction. Furthermore, all other grids will be below cutoff thereby maintaining those tubes in a nonconductive state.

When a positive pulse of short duration is impressed upon lead 55 all cathodes will be correspondingly raised in voltage. The conducting tube is thereby cut off and its anode voltage will increase essentially instantaneously to B+ voltage. But its anode is capacitively coupled to the grid of one and only one tube. Because of such capacitive coupling that grid so coupled becomes momentarily much more positive than any other grid. Thus, the tube possessing that grid now becomes conductive and remains so to the exclusion of others after lead 55 returns to normal. Thus, if tube 57 is initially conducting, a pulse at lead 55 causes it to be cut off and its anode increases in voltage thereby raising the voltage of grid 88 of tube 58 by virtue of the coupling condenser 92.

When tube 58 becomes conductive, its anode 75 decreases in voltage. Thus, grid 89 of tube 59 is similarly decreased momentarily below its normal cut off value because of coupling condenser 93. Its rate of return to normal value is dependent upon the values of condenser 93 and resistor 101. These values must satisfy conditions similar to those discussed relative to condensers 34 and 37 and resistors 33 and 36 of tubes 17 and 18 and the discharge time of condenser 93 must be decreased since tube 59 is the next tube in the sequence to be made conductive. As before and for the same reasons, a rectifier 124 is provided whereby condenser 93 is allowed a discharge path, in addition to resistor 101, through rectifier 124, resistor 67, and the conducting tube 58. The grid circuit of each tube is similarly provided with rectifiers insuring essentially instantaneous return of grid voltage to normal after being driven beyond cutoff. Thus, tubes 57 to 61, inclusive, will conduct in sequence with the conductive condition being shifted one step for each positive pulse impressed on lead 55 progressing around the ring from tube 57 to 61 in sequence and returning to 57 from 61.

The metering or counting circuit including meter 127 operates in the following manner. One terminal of meter 127 is maintained at a voltage equal to the anode voltage of tubes 58 to 61, inclusive, when such tubes are in a nonconductive state. This is accomplished by proper choice of resistors 128 and 129 which constitute a voltage divider between B+ and ground. A voltage divider consisting of resistors 135 and 136 in series is connected between anode 23 of tube 17 and ground and is so proportioned that the voltage at the junction of resistors 135 and 136 equals the voltage of the junction between resistors 128 and 129 when tube 17 is nonconductive. Thus, no current flows through resistor 134 when tube 17 is nonconductive. Resistor 134 is adjusted to allow unit current flow through it and through meter 127 when tube 17 is conductive. Similarly, no current flows through resistors 130 to 133, inclusive, when tubes 58 to 61, inclusive, are nonconductive. Resistor 130 is adjusted to allow two times unit current flow through it and through meter 127 when tube 58 is conducting. Resistors 131 to 133, inclusive, are similarly adjusted; four times unit current through 131, six times unit current through 132, and eight times unit current through resistor 133. Thus, depending upon which tubes among 17 and 58 to 61, inclusive, are conductive, meter 127 carries and indicates a current which is any number of whole units between zero and nine, inclusive. This is shown in tabular form by Fig. 3. Fig. 3 also indicates the sequence in which the various tubes become conductive.

The double triode tube 137 and associated elements constitute a multivibrator of the type requiring a positive pulse to make the first half conductive and which automatically after a short interval of time returns the first half to a nonconductive state. This time interval is dependent upon the values of condenser 150 and resistors 151 and 152, all of which elements affect the grid of the second half of tube 137. The anode of the second half is thereby pulsed positively for a fixed time interval for each positive pulse on the grid of the first half. This pulse may be made available to output terminals by capacitive coupling between the anode and one of such terminals.

When tube 61 becomes conductive, anode 78 decreases in voltage and grid 141 of tube 137 is driven negatively. Such a negative pulse on grid 141 does not affect tube 137 since the first half of tube 137 is already in a nonconductive state. When tube 61 is cut off, grid 141 is driven positively thereby causing the first half to be conductive and causing anode 146 to increase in voltage. Thus, a positive pulse appears at the output terminals each time tube 61 is made nonconductive. To insure readiness of grid 141 to cause the first half of tube 137 to become conductive immediately after it has been pulsed negatively, a rectifier 144 is provided through which condenser 142 may discharge when grid 141 is beyond cutoff.

The circuit disclosed produces a positive output pulse for every ten positive input pulses. It will be understood that a factor of two, four, six, or eight might also be obtained by use of correspondingly fewer tubes. For any of the possible ratios, my invention may be used to increase the response rate and will be as necessary in these circuits as in the originally described circuit.

An auxiliary output circuit may be energized directly from the anode circuit of tube 61. It may be preferable to employ individual voltage dividers in parallel in the plate circuit of tube 61 so as to isolate the two output circuits from each other as to the effects of output load on the plate circuit of tube 61. The auxiliary output circuit might be used, for example, to supply input pulses to a circuit exactly identical with the described circuit. If mechanical registers are employed to measure the output of each of such interconnected circuits, one register would read tens, the other hundreds, while meter 127 would read units.

I have employed a circuit of the type described and have found it capable of accurately recording pulses as short as .05 microsecond duration and also capable of recording a series of pulses of varying length even though separated by intervals as small as 0.1 microsecond.

As will occur to those skilled in the art, various different arrangements and combinations of the principles described above may be employed without departing from the true spirit and scope of the invention, and I therefore do not wish to limit my invention to the particular arrangement described.

What I claim as new and desire to secure by Letters Patent of the United States is:

1. In combination, a plurality of thermionic tubes possessing electrodes including a control electrode, a cathode and an anode, means for connecting the anode of each tube through a separate impedance to the positive lead of a direct current source and all cathodes through a common impedance to the negative lead of such source, a plurality of voltage divider circuits formed by connections from the control grid of each tube to the anodes of the remaining tubes of said plurality, each through a separate non-capacitive impedance and connections from each control electrode to the negative lead of said source through a separate impedance, capacitor means for capacitively coupling the anode of each tube to the control electrode of the next tube in said plurality, said tubes chosen in any desired continuous sequence, means for applying a signal voltage across said impedance common to all cathodes of said plurality of tubes, and rectifying means for each tube of said plurality of tubes connected from the control electrode of such tube to a tap on said impedance common to all cathodes of said plurality of tubes for providing a discharge path for the coupling capacitor associated with such tube when the voltage on the control electrode of such tube is below a desired value.

2. A flip-flop circuit comprising first and second thermionic tubes each having an anode, a control electrode, and a cathode, positive and negative terminals for connection to a direct voltage source, load resistors connected between said positive terminal and respective ones of said anodes, said cathodes being connected together, first and second cathode resistors connected in series in the order named between said cathodes and said negative terminal, a capacitor connected in parallel with said first cathode resistor, said second cathode resistor having no capacitor in parallel therewith, a resistor and a capacitor in parallel connected between the anode of said first tube and the control electrode of said second tube, a resistor and a capacitor in parallel connected between the anode of said second tube and the control electrode of said first tube, resistors connected between respective ones of said control electrodes and said negative terminal, and separate rectifiers connected between each of said control electrodes and the circuit junction between said first and second cathode resistors, said rectifiers having their polarities so arranged that the rectifiers conduct current most easily when said control electrodes are at negative potential relative to said circuit junction.

JAMES L. LAWSON.

REFERENCES CITED

The following references are of record in the file of this patent:

UNITED STATES PATENTS

| Number | Name | Date |
|---|---|---|
| 1,762,712 | Charlton | June 10, 1930 |
| 1,972,535 | Page | Sept. 4, 1934 |
| 1,995,890 | Lord | Mar. 26, 1935 |
| 2,113,011 | White | Apr. 5, 1938 |
| 2,405,664 | Mumma | Aug. 13, 1946 |
| 2,405,843 | Moe | Aug. 13, 1946 |
| 2,409,689 | Morton | Oct. 22, 1946 |
| 2,410,156 | Flory | Oct. 29, 1946 |
| 2,420,516 | Bischoff | May 13, 1947 |
| 2,470,716 | Overbeck | May 17, 1949 |

FOREIGN PATENTS

| Number | Country | Date |
|---|---|---|
| 572,884 | Great Britain | Oct. 29, 1945 |